United States Patent
Hamano et al.

(12) 
(10) Patent No.: US 6,458,483 B1
(45) Date of Patent: Oct. 1, 2002

(54) LITHIUM ION SECONDARY BATTERY

(75) Inventors: Kouji Hamano; Osamu Hiroi; Yasuhiro Yoshida; Shoji Yoshioka; Hisashi Shiota; Makiko Kise; Shigeru Aihara; Daigo Takemura; Jun Aragane; Hiroaki Urushibata; Sei Tsunoda, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/559,074

(22) Filed: Apr. 27, 2000

(51) Int. Cl.[7] ............................................... H01M 2/02
(52) U.S. Cl. ...................... 429/177; 429/127; 429/306; 429/326
(58) Field of Search ................................ 429/177, 127, 429/326, 306

(56) References Cited

U.S. PATENT DOCUMENTS

| | | | |
|---|---|---|---|
| 4,997,732 A | | 3/1991 | Austin et al. |
| 5,637,418 A | * | 6/1997 | Brown et al. ................ 429/127 |
| RE35,746 E | * | 3/1998 | Lake ........................... 429/127 |
| 6,051,342 A | | 4/2000 | Hamano et al. |
| 6,255,010 B1 | * | 5/2001 | Hamano et al. ............ 429/306 |

* cited by examiner

*Primary Examiner*—John S. Maples
(74) *Attorney, Agent, or Firm*—Oblon, Spivak, McClelland, Maier & Neustadt, P.C.

(57) ABSTRACT

A lithium ion secondary battery having an electrode body including a positive electrode made of a positive electrode active material layer joined to a current collector, a negative electrode made of a negative electrode active material layer joined to a current collector, a separator which is disposed between the positive electrode and the negative electrode and retains an electrolytic solution containing lithium ions, and a porous adhesive resin layer which retains the electrolytic solution and joins the separator to at least one of the positive electrode active material layer and to the negative electrode active material layer, the electrode body being sealed into a packaging bag, wherein an adhesive resin film capable of absorbing the electrolytic solution and gelling adheres the electrode body to the packaging bag.

19 Claims, 4 Drawing Sheets

LITHIUM ION SECONDARY BATTERY

BACKGROUND OF THE INVENTION

1. Field of the Invention

This invention relates to a lithium ion secondary battery comprising a positive electrode and a negative electrode facing each other via a separator retaining an electrolytic solution.

2. Description of the Related Art

There has been an eager demand for reduction in size and weight of portable electronic equipment. To meet the demand, it is essentially required to improve performance of secondary batteries used as a power source. In recent years various batteries have been developed, and improvements have been added thereto aiming for improved battery performance. Battery characteristics expected to be improved include voltage, energy density, resistance to high load, freedom of shape designing, and safety. Of currently available batteries, lithium ion batteries are the most promising secondary batteries for realizing a high voltage, a high energy density, and excellent resistance to high load and have been and will be given improvements.

A lithium ion secondary battery basically comprises a positive electrode, a negative electrode, and an ion conducting layer interposed between the electrodes. The rounded or angular lithium ion secondary batteries that have been put to practical use employ a positive electrode plate prepared by applying to an aluminum current collector a mixture comprising a powdered complex oxide of lithium and cobalt, nickel or manganese, a powdered electron conductor, and a binder resin; a negative electrode plate prepared by applying to a copper current collector a mixture of a powdered carbonaceous active material, such as graphite, non-graphitizing carbon or coke, and a binder resin; and an ion conducting layer made of a porous film of polyethylene, polypropylene, etc. filled with a nonaqueous solvent containing lithium ions.

FIG. 6 schematically illustrates a longitudinal section of a conventional cylindrical lithium ion secondary battery disclosed, e.g., in JP-A-8-83608. The battery shown in FIG. 6 has an electrode body 2 put in a case 1 made of stainless steel which also serves as a negative electrode terminal. The electrode body 2 is a roll of a laminate composed of a positive electrode 3, a separator (ion conducting layer) 4 impregnated with an electrolytic solution, and a negative electrode 5. In order for the electrode body 2 to maintain electrical connections among the positive electrode 3, the separator 4, and the negative electrode 5, it is necessary to apply external pressure thereto. For this purpose, the electrode body 2 is put into a firm case 1 to apply pressure for maintaining all the planar contacts. In the case of angular batteries, an external pressing force is imposed to a stack of strip electrode bodies by, for example, putting the stack in a rectangular metal case.

That is, a contact between a positive electrode and a negative electrode in commercially available lithium ion secondary batteries has been made by using a firm housing made of metal, etc. Without such a housing, the electrodes would be separated at their interface, and the battery characteristics would be deteriorated due to difficulty in maintaining electrical connections. However, occupying a large proportion in the total weight and volume of a battery, the housing causes reduction in energy density of the battery. Moreover, the rigidness of the case narrows the freedom of battery shape design.

Under such circumstances, development of lithium ion secondary batteries which do not require a firm housing has been proceeding, aiming at reductions in weight and thickness. The key to development of batteries requiring no housing is how to maintain an electrical connection between each of a positive electrode and a negative electrode and an ion conducting layer (i.e., separator) interposed therebetween without adding an outer force. A method comprising bringing electrodes and a separator into intimate contact by means of a resin and the like has been proposed as a joining means requiring no outer force.

For example, JP-A-5-159802 teaches a method in which an ion-conducting solid electrolyte layer, a positive electrode, and a negative electrode are heat-bonded into a unitary body by use of a thermoplastic resin binder. According to this technique, electrodes are brought into intimate contact with the solid electrolyte as an ion conducting layer over their whole area so that the electrical connections between electrodes and the solid electrolyte is maintained to perform the function as a battery without applying outer force. In general, however, ion conductivity, which is one of the physical characteristics governing battery performance, is much lower in a solid electrolyte than in a liquid electrolyte. It is therefore infeasible for the time being to obtain batteries which use a solid electrolyte and yet execute the same performance as conventional batteries using a liquid electrolyte.

In order to settle the problems associated with lithium ion secondary batteries using a solid electrolyte, JP-A-10-172606, etc. disclose batteries having a positive and a negative electrode adhered to a separator with a porous adhesive resin and having an electrolytic solution infiltrated into the positive electrode, the negative electrode, the separator, and the adhesive resin. In this type of batteries, since the positive electrode, the separator, and the negative electrode can be brought into intimate contact without applying external pressure, a lightweight bag can be used for packaging thereby to provide a lightweight battery having no rigid case.

A lithium ion secondary battery having the above-described electrode body in which the positive electrode, the separator, and the negative electrode are intimately adhered with a porous adhesive resin is produced by putting the electrode body in a packaging bag and vacuum-sealing the bag. There is thus provided a very thin and light lithium ion secondary battery. However, cases are sometimes met with in which the electrolytic solution vaporizes or decomposes to generate gas in use or during storage of the battery under some environmental conditions or some charging conditions. Because the contact between the packaging bag and the electrode body owes only to the pressure difference between the inside and the outside of the bag, an increase in inner pressure due to gas generation inflates the bag. It tends to follow that the bag is broken, and the electrolytic solution leaks out to damage the equipment.

SUMMARY OF THE INVENTION

In the light of the above problem, the present inventors have conducted extensive investigation to suppress deformation or breakage of a battery packaging bag due to gas which may generate on vaporization or decomposition of an electrolytic solution. It is an object of the present invention to provide a lithium ion secondary battery which is thin and light and yet the packaging bag of which is suppressed from expansive deformation due to gas generated in case of a temperature rise during storage or in use.

The invention provides a lithium ion secondary battery having an electrode body comprising a positive electrode made of a positive electrode active material layer joined to a current collector, a negative electrode made of a negative electrode active material layer joined to a current collector, a separator which retains an electrolytic solution containing lithium ions and is disposed between the positive electrode and the negative electrode, and a porous adhesive resin layer which retains the electrolytic solution and joins each of the positive electrode active material layer and the negative electrode active material layer to the separator, the electrode body being sealed into a packaging bag, wherein a resin film is provided between the electrode body and the packaging bag in intimate contact with the electrode body.

DETAILED DESCRIPTION OF THE DRAWINGS

DESCRIPTION OF THE PREFERRED EMBODIMENTS

Figure 1:
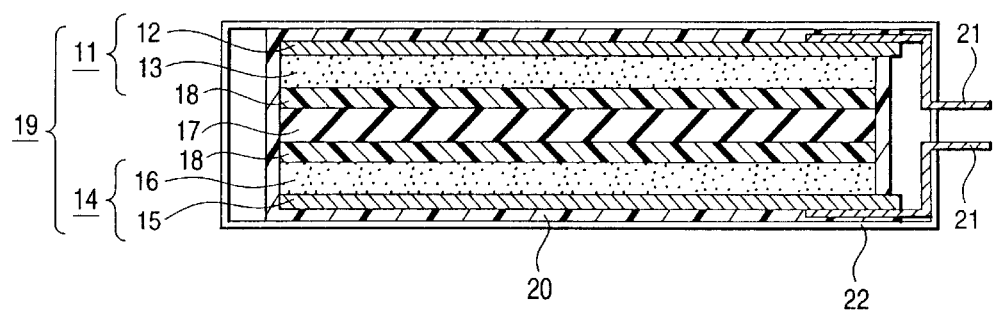
FIG. 1 is a schematic cross section of a lithium ion secondary battery according to a first aspect of the invention.

FIG. 1 is a schematic cross section of a lithium ion secondary battery according to a first aspect of the invention, wherein a positive electrode 11 having a positive electrode active material layer 13 joined to a positive electrode current collector 12, a negative electrode 14 having a negative electrode active material layer 16 joined to a negative electrode current collector 15, and a separator 17 which is interposed between the positive electrode 11 and the negative electrode 14 and retains a nonaqueous electrolytic solution containing lithium ions constitute an electrode body 19. A porous adhesive resin layer 18 is provided between the positive electrode active material layer 13 and the separator 17 and between the negative electrode active material layer 16 and the separator 17 to join the separator to both the active material layers 13 and 16. The porous adhesive resin layer 18 has a large number of continuous pores interconnecting the separator and each of the active material layers 13 and 16. The porous adhesive resin layer 18 contains the lithium ion-containing nonaqueous electrolytic solution in its interconnecting pores to establish electrical connections between the separator 17 and each of the positive and negative electrodes 11 and 14. Numeral 20 is a resin film provided on the whole periphery of the electrode body 19 in intimate contact with the electrode body 19. The electrode body 19 covered with the resin film 20 is put in a packaging bag 22 to make a battery of the invention. Electrode tabs 21 are attached to the positive electrode current collector 12 and the negative electrode current collector 15, respectively.

The lithium ion secondary battery according to JP-A-10-172606 supra is made by putting the electrode body 19 impregnated with an electrolytic solution into the packaging bag 22 as it is, followed by vacuum sealing. Therefore, in case of gas generation inside the electrode body 19, the gas released from the inside of the electrode body 19 stays between the electrode body 19 and the bag 22. It may follow that the bag 22 expands and breaks, resulting in leakage of the electrolytic solution.

According to the above-described embodiment of the invention, to the contrary, the electrode body 19 is sealed in the resin film 20 which is provided between the electrode body 19 and the packaging bag 22 in intimate contact with the electrode body 19. It is therefore possible to confine within the electrode body 19 the gas generated on vaporization of the electrolytic solution due to a rise of temperature in the surrounding environment or a rise of temperature in the battery body which may occur, for example, during rapid discharging or on decomposition of the electrolytic solution which may accompany electrode reaction. As a result, even in case where gas is generated with a temperature rise or decomposition of the electrolytic solution accompanying electrode reaction, the expansive deformation of the battery body can be suppressed, and breakage of the packaging bag and the resultant leakage of the electrolytic solution are less likely to occur as compared with conventional batteries.

In a preferred embodiment, a resin having adhesiveness is used as the resin film 20, whereby the electrode body 19 and the packaging bag 22 can be adhered to each other. In this case, there is no space in the battery, i.e., between the electrode body 19 and the bag 22 in which gas may gather, and the packaging bag 22 can be prevented from expanding more effectively.

In a preferred embodiment, the resin film 20 is made of a material capable of absorbing the electrolytic solution present in the battery. An excess of the electrolytic solution will be absorbed by the resin film 20 to prevent leakage of the electrolytic solution more effectively. That is, even when the packaging bag 22 is broken, the equipment containing the battery could be protected from corrosion and the like by the leak.

It is also preferred to use a material capable of gelling as the resin film 20. In this embodiment, the resin film 20 has sufficient softness to keep close contact with the electrode body 19 even if the electrode body 19 is deformed, and the packaging bag or the electrode body 19 is less likely to break by an external shock, etc. The liquid filling the gel is preferably the nonaqueous solvent used in the electrolytic solution. Examples of suitable nonaqueous solvents include esters such as diethyl carbonate and ethers such as dimethoxyethane.

It is preferred for the starting materials of the resin used to form the resin film 20 be liquid at room temperature for the ease of applying to the periphery of the electrode body and also be stable thermally after being made into a resin. For example, compounds having an isocyanate group, an acrylate group or a methacrylate group are preferred. Suitable examples of the resins prepared from such compounds include polyurethane resins obtained by polyaddition of a diisocyanate and a diol having a hydroxyl group at both terminals, polyurea resins obtained by polyaddition of a diisocyanate and a diamine, polyalkylene glycol acrylate resins obtained by polymerization of an oligo(alkylene glycol) acrylate, and polyalkylene glycol methacrylate resins obtained by polymerization of an oligo(alkylene glycol) acrylate.

Being liquid at room temperature, the starting materials are easy to apply to the electrode body. Further the resins prepared exhibit adhesiveness and capability of absorbing an electrolytic solution. They also have capability of gelling upon absorbing an electrolytic solution or a liquid.

The lithium ion secondary battery having the above-described structure is obtained by, for example, impregnating the electrode body 19 with an electrolytic solution, dipping the impregnated electrode body 19 in a liquid mixture of a diisocyanate and a diol, vacuum sealing the electrode body 19 in a packaging bag 22, and heating the package at 50° C. for 30 minutes.

The active materials used in the positive electrode include complex oxides of lithium and at least one transition metal such as cobalt, nickel or manganese, chalcogen compounds comprising lithium, and complex compounds thereof; these compounds may have dopant elements. The positive electrode active material is mixed with graphite as an electron conductor. Various materials having a low electrochemical potential and capable of intercalating and disintercalating lithium, which is the main substance participating in the battery reaction, can be used as a negative electrode active material. Examples of suitable negative electrode materials include carbonaceous materials such as graphite, graphitizing carbon, non-graphitizing carbon, coke, polyacene, and polyacetylene; and aromatic hydrocarbons having an acene structure such as pyrene or perylene. These materials are used in a particulate form having a particle size of 0.3 to 20 $\mu$m, particularly 0.3 to 5 $\mu$m. Additionally, carbon fiber is also useful as a negative electrode active material.

Any binder resin that is insoluble in an electrolytic solution and undergoes no electrochemical reaction in the electrode body can be used for binding an active material into an electrode plate. Examples of useful binder resins are homo- or copolymers of vinylidene fluoride, ethylene fluoride, acrylonitrile, and ethylene oxide, and ethylenepropylenediamine rubber.

Any metal stable within a battery can be used as a current collector. Aluminum is preferred for a positive electrode, and copper is preferred for a negative electrode. The current collector can be foil, net, expanded metal, etc. Foil is preferred for securing smoothness of the electrodes.

The adhesive resins which can be used for joining the active material layers and the separator include those which neither dissolve in the electrolytic solution nor undergo electrochemical reaction inside a battery and are capable of forming a porous film. Specific examples of useful resins include polymers or copolymers containing a fluorine atom in the molecular structure thereof, e.g., polyvinylidene fluoride and polytetrafluoroethylene, and their mixtures with polymethyl methacrylate, polystyrene, polyethylene, polypropylene, etc. Polyvinylidene fluoride, which is a fluorocarbon resin, is particularly suitable.

Any electron-insulating separator that has sufficient strength in joining with electrodes, such as porous film, net, and nonwoven fabric, can be used. While not limiting, a porous polyethylene or polypropylene film having a single layer structure or a multilayered structure is preferred for its adhesiveness and safety.

The solvent and the electrolyte which make an electrolytic solution serving as an ion conductor can be any of nonaqueous solvents and any of lithium-containing electrolyte salts that have been employed in conventional batteries. Examples of useful solvents include esters, such as ethylene carbonate, propylene carbonate, dimethyl carbonate, diethyl carbonate, and methylethyl carbonate; ethers, such as dimethoxyethane, diethoxyethane, diethyl ether, and dimethyl ether; and mixed solvents consisting of two members selected from the ether solvents or the ester solvents or mixed solvents consisting of one member selected from the former group and one member selected from the latter group. Examples of useful electrolyte salts are $LiPF_6$, $LiAsF_6$, $LiClO_4$, $LiBF_4$, $LiCF_3SO_3$, $LiN(CF_3SO_2)_2$, $LiC(CF_3SO_2)_3$, and $LiN(C_2F_5SO_2)_2$.

The packaging bag is made of a material that is impermeable to moisture in the air and resistant to the electrolytic solution. For example, a bag can be made of a composite laminate comprising an electrolytic solution-resistant resin layer, such as nylon, polyethylene, polypropylene, etc., and aluminum foil as an outermost layer impermeable to moisture.

Figure 2:
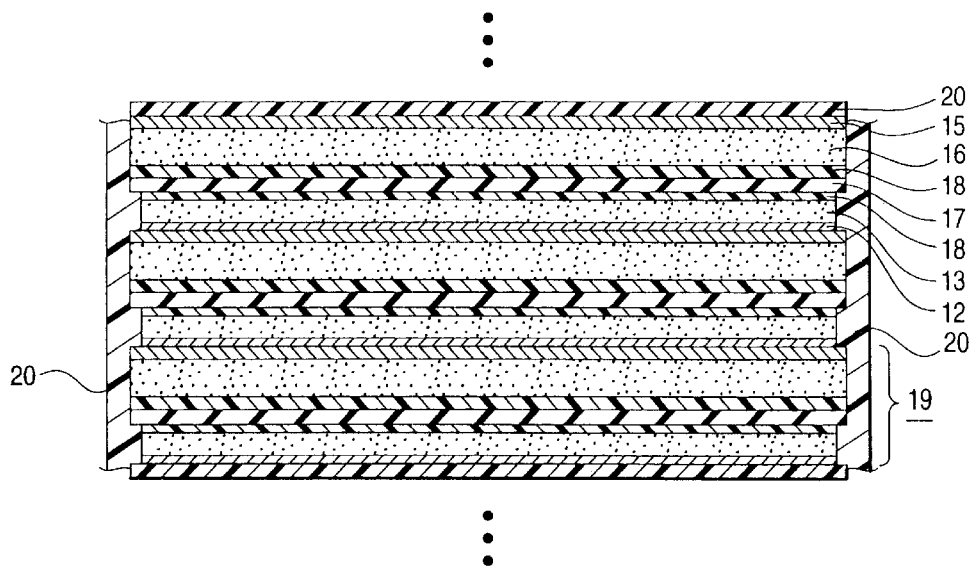
FIG. 2 is a schematic cross section of a lithium ion secondary battery according to a second aspect of the invention.
Figure 3:
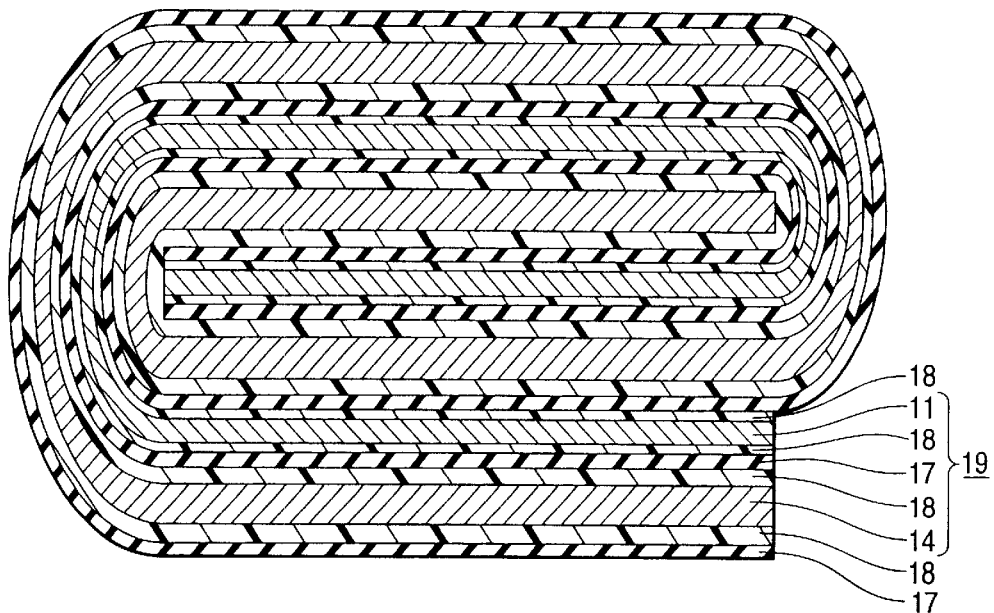
FIG. 3 is a schematic cross section of another lithium ion secondary battery according to the second aspect of the invention.

In a second aspect of the present invention, the capacity of the battery can be increased by stacking a plurality of electrode bodies 19 to form an electrode laminate, a partial cross section of which is shown in FIG. 2, or tightly rolling an electrode body 19 having a band form into solid cylinder (hereinafter also referred to as an electrode laminate) as shown in FIG. 3.

In the embodiment shown in FIG. 2, as long as the current collector at the top and the bottom of the electrode laminate is of a gas-impermeable material such as metal foil, gas does not leak from these sides so that the resin film 20 provided only on the four sides perpendicular to the electrode plane (the right and the left side of the cross section of FIG. 2 and the front and the rear side parallel to the surface of the paper) would suffice to confine generated gas within the electrode laminate.

In the case of the roll of the electrode body shown in FIG. 3, as long as the outer current collector is of a gas-impermeable material such as metal foil, gas does not leak from the periphery around the roll so that the resin film 20 provided only on the sides perpendicular to the electrode plane (the front and the rear side parallel to the surface of the paper) would be enough to confine generated gas within the electrode laminate. Gas will leak slightly from the open end of the roll (the portion to which numeral 19 is affixed in FIG. 3), it is preferable to form the resin film 20 also on that portion).

Figure 4:
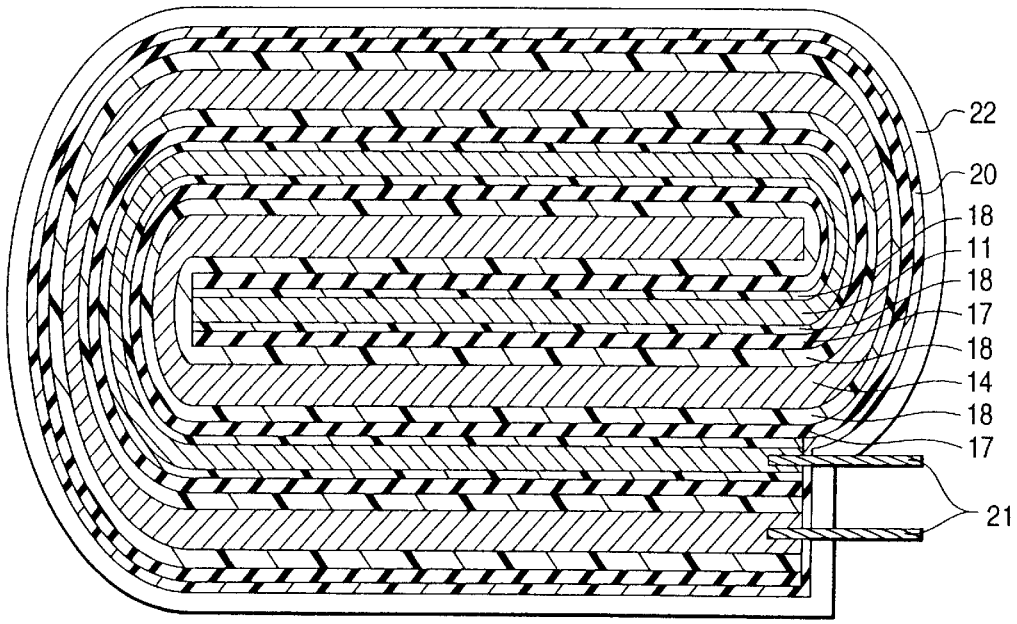
FIG. 4 is a schematic cross section of still another lithium ion secondary battery according to the second aspect of the invention.

The resin film 20 may also be provided on all the exterior surface of the electrode laminate as shown in FIG. 4.

When the resin film is provided only where necessary as in the embodiments shown in FIGS. 2 and 3, the resin material is saved, and the increase in battery volume due to the resin film is minimized. Where the resin film is provided on all the exterior surface of the electrode laminate as in the embodiment shown in FIG. 4, formation of the resin film can conveniently be carried out by dipping the whole electrode laminate in a liquid resin material as demonstrated in Examples hereinafter given.

As described above, since the positive electrode 11 and the negative electrode 14 are intimately adhered to the separator 17 with the adhesive resin layer 18 having interconnecting pores in which the electrolytic solution is retained, satisfactory ion conduction is maintained without the aid of external pressure application, i.e., a rigid battery case. As a result, the battery of the invention can exhibit equal battery characteristics with a reduced weight and a reduced thickness as compared with conventional batteries having a rigid case. The resin film 20 provided around the electrode laminate shuts in gas generated therein to suppress expansive deformation of the packaging bag 22, which will lead to breakage of the bag and leaks of the electrolytic solution.

The present invention will now be illustrated in greater detail with reference to Examples, but it should be understood that the invention is not deemed to be limited thereto. Unless otherwise noted, all the parts are given by weight.

EXAMPLE 1

Preparation of Positive Electrode

Eighty-seven parts of $LiCoO_2$, 8 parts of graphite powder, and 5 parts of polyvinylidene fluoride (PVDF) were dispersed in N-methylpyrrolidone (NMP) to prepare a positive electrode active material paste. The paste was applied to a temporary substrate with a doctor blade to a coating thickness of 300 μm to form a positive electrode active material later. A piece of 30 μm thick aluminum foil was superposed thereon as a positive electrode current collector, and the positive electrode active material paste was again spread on the foil with a doctor blade to a thickness of 300 μm. The double-coated aluminum foil was allowed to stand in a drier kept at 60° C. for 60 minutes to make the paste half-dried. The resulting laminate was calendered through rolls having the nip adjusted to 550 μm to prepare a positive electrode 1.

Preparation of Negative Electrode

Ninety-five parts of Mesophase Microbead Carbon (a trade name, produced by Osaka Gas Co., Ltd.) and 5 parts of PVF were dispersed in NMP to prepare a negative electrode active material paste. The paste was applied to a temporary substrate with a doctor blade to a thickness of 300 μm to form a negative electrode active material layer. A piece of 20 μm thick copper foil was placed thereon as a negative electrode current collector, and the negative electrode active material paste was again spread thereon with a doctor blade to a thickness of 300 μm. The laminate was allowed to stand in a drier at 60° C. for 60 minutes to make the paste half-dried. The resulting laminate was calendered through rolls having the nip adjusted to 550 μm to prepare a negative electrode.

Preparation of Battery

Five parts of PVF and 95 parts of NMP were mixed and thoroughly stirred to prepare a uniform viscous solution of an adhesive resin. The adhesive resin solution thus prepared was applied to each side of a porous polypropylene sheet (Cellguard #2400, produced by Hoechest) as a separator. The amount of the adhesive resin applied is adjustable by varying the amount of the solution dropped. Before the adhesive resin solution dried, the double-coated separator was sandwiched in between the positive electrode and the negative electrode with intimate contact. The adhesive resin solution was applied to the other side of the positive electrode, and the separator was stuck thereto. The resulting electrode body was rolled up as shown in FIG. 3, and the roll was dried in a vacuum oven at 60° C. to completely evaporate NMP under reduced pressure. On evaporation of NMP from the adhesive resin solution, the resin layer became a porous adhesive resin layer having pores interconnecting the separator to the positive electrode and the negative electrode.

A current collecting tab was attached to each of the positive electrode current collector and the negative electrode current collector. The resulting electrode body was impregnated with an electrolytic solution by dipping.

Twenty parts of 4,4'-diphenylmethane diisocyanate (MDI) having two isocyanate groups per molecule (liquid) and 80 parts of an ethylene glycol-propylene glycol copolymer having a hydroxyl groups at both terminals (hereinafter abbreviated as PEGPG (liquid; molecular weight: 1100) were mixed to prepare a liquid monomer mixture, in which the electrolytic solution-impregnated electrode body was dipped and taken out immediately to apply the liquid all over the electrode body. The electrode body was put in a packaging bag and vacuum sealed. The resulting package was heated at 50° C. for 30 minutes to cure the resin film to obtain a lithium ion secondary battery shown in FIG. 4.

Figure 5:
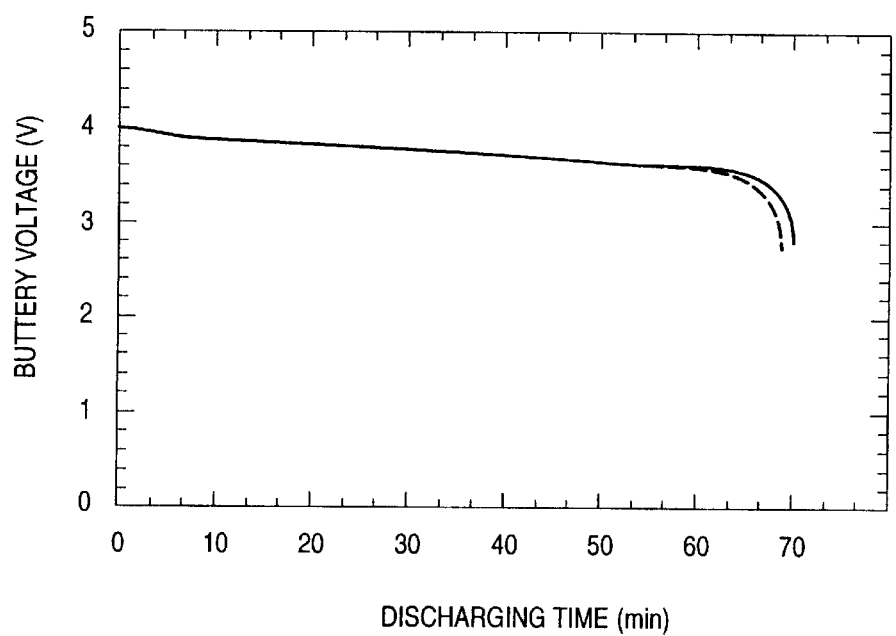
FIG. 5 is a graph showing the discharge characteristics of the battery of Example 1 and a conventional battery of the same type.
Figure 6:
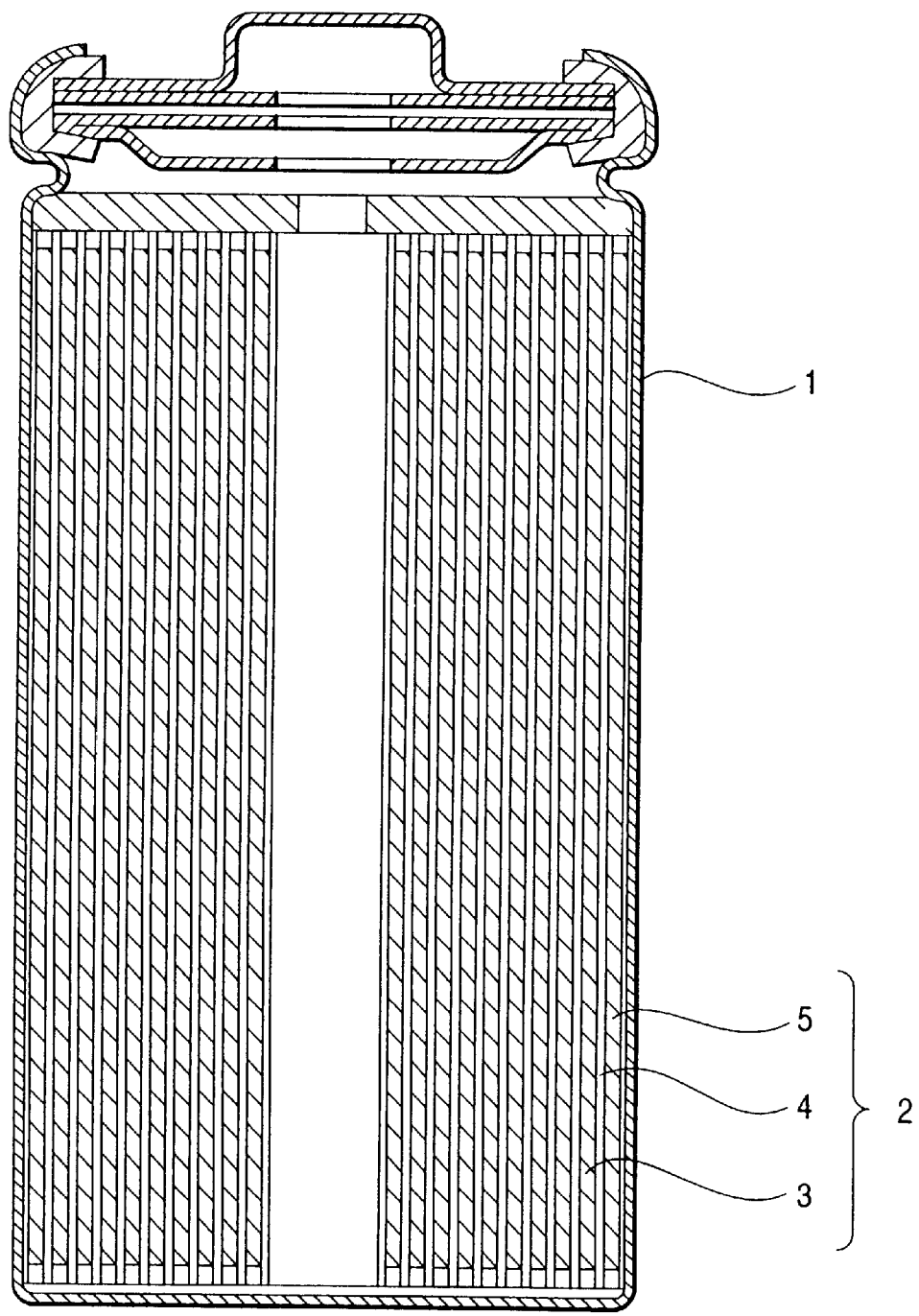
FIG. 6 is a schematic longitudinal section of a conventional cylindrical lithium ion secondary battery.

FIG. 5 is a graph showing the discharge characteristics of the resulting battery (represented by the solid line) and of a conventional battery having no resin film around the electrode body which was prepared in the same manner as described above except that the electrolytic solution-impregnated electrode body was vacuum sealed in the packaging bag (represented by the broken line). The discharge characteristics are those obtained at a discharging rate of 1C; "1C" denotes a condition that a discharge is carried out at such a current that the designed battery capacity is consumed in 1 hour (hereinafter the same). It is seen that the battery of Example 1 is equal to the conventional battery in battery performance.

The battery of Example 1 and the conventional battery were stored at 85° C. for 10 hours. An increase in volume of the battery body is shown in Table 1 below, wherein the increase of volume is relatively expressed taking that of the conventional battery as 1 (hereinafter the same). As shown in Table 1, the volume increase of the battery of Example 1 is remarkably suppressed as compared with that of the conventional battery. After the storage, the battery of Example 1 showed no leak of the electrolytic solution. When the packaging bag was opened, the electrode body and the bag were found adhering to each other via the resin film, the resin film had been gelled, and the electrolytic solution had not at all oozed out of the electrode body.

TABLE 1

|  | Increase in Volume |
|---|---|
| Conventional Battery | 1 |
| Battery of Example 1 | 0.08 |

EXAMPLE 2

An electrolytic-solution impregnated electrode body of roll form was prepared in the same manner as in Example 1. Only the edges of the roll, i.e., the two sides perpendicular to the electrode plane, were successively dipped in the same liquid monomer mixture as used in Example 1. The electrode body was vacuum sealed in a packaging bag and heated in the same manner as in Example 1 to complete a lithium ion battery.

The discharge characteristics of the resulting battery were determined in the same manner as in Example 1 to confirm the same performance as obtained in Example 1. When the battery was stored at 85° C. for 10 hours, the increase in volume was considerably reduced as compared with that observed with the conventional battery as shown in Table 2 below. Further, no leak of the electrolytic solution was observed. When the bag was opened, it was found that the bag was adhering to the edges of the electrode roll via the resin film, the resin film had been gelled, and the electrolytic solution had not at all oozed out of the electrode body.

According to the above-described battery structure, the packaging bag and the electrode body are easily adhered to each other, and the resin film is ready to gel so that an excess of the electrolytic solution does not leak out.

TABLE 2

| | Increase in Volume |
|---|---|
| Conventional Battery | 1 |
| Battery of Example 2 | 0.12 |

EXAMPLE 3

Lithium ion secondary batteries were prepared in the same manner as in Examples 1 and 2, except for replacing the MDI/PEGPG mixture with each of (a-1) to (a-4) mixtures of MDI and polyethylene glycol (molecular weight: 200, 300, 400 or 600), (b-1) to (b-2) mixtures of MDI and polypropylene glycol diol (molecular weight: 400 or 700), (c-1) to (c-3) mixtures of MDI and polypropylene glycol triol (molecular weight: 300, 700 or 1500), (d) a mixture of MDI and 1,8-diaminooctane, and (e) a mixture of MDI and 1,4-diaminobutane.

The discharge characteristics of the resulting batteries were measured in the same manner as in Example 1. As a result, each of the batteries was equal in battery performance to the conventional battery whether the resin film was provided all over the exterior surface of the electrode roll or on only the two edges of the electrode roll. When the batteries having the resin film all over the electrode body were stored at 85° C. for 10 hours, the increase in volume was considerably reduced as compared with that observed with the conventional battery as shown in Table 3 below. The increase in volume of the batteries having the resin film only on the edges of the electrode body was similarly reduced as compared with the conventional battery. Further, all the batteries of Example 3 suffered from no leak of the electrolytic solution after the storage. When the bag was opened, it was found that the electrode body and the bag were adhering to each other via the resin film, the resin film had been gelled, and the electrolytic solution had not at all oozed out of the electrode body.

TABLE 3

| Battery | Resin Film | Increase in Volume |
|---|---|---|
| Conventional | none | 1 |
| Example 3 | a-1 | 0.15 |
| | a-2 | 0.15 |
| | a-3 | 0.17 |
| | a-4 | 0.18 |
| | b-1 | 0.18 |
| | b-2 | 0.20 |
| | c-1 | 0.10 |
| | c-2 | 0.15 |
| | c-3 | 0.21 |
| | d | 0.15 |
| | e | 0.12 |

EXAMPLE 4

In the production of batteries as described in Examples 1 and 2, it was possible to form the resin film 20 by using a mixture comprising at least one of the following compounds.

Oligo(ethylene glycol) diacrylate (molecular weight: 302 or 522) represented by formula:

$$CH_2=CH-CO-O-(CH_2CH_2O)_n-CO-CH=CH_2 (n=4 \text{ or } 9)$$

Oligo(ethylene glycol) dimethacrylate (molecular weight: 330, 726 or 1166) represented by formula:

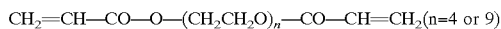
(n=4, 13, 23)

Oligo (ethylene glycol) acrylate represented by formula:

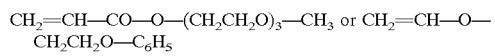

Oligo(ethylene glycol) methacrylate represented by formula:

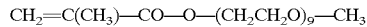

Lithium ion secondary batteries were produced in the same manner as in Examples 1 and 2, except for replacing the MDI/PEGPG mixture with the above-described mixture having azobisisobutyronitrile (AIBN) added thereto as a polymerization initiator and heating the packaged battery body at 60° C. for 30 minutes to cure the resin. As a result of measurement of discharge characteristics, each of the batteries was equal in battery performance to the conventional battery whether the resin film was provided all over the exterior surface of the electrode roll or on only the edges of the electrode roll. When the batteries of Example 4 were stored at 85° C. for 10 hours, the increase in volume was considerably reduced as compared with that observed with the conventional battery, whether the resin film was provided all over the electrode roll or on only the edges of the electrode roll. Further, all the stored batteries of Example 4 suffered from no leak of the electrolytic solution. When the bag was opened, it was found that the electrode body and the bag were adhering to each other via the resin film, the resin film had been gelled, and the electrolytic solution had not at all oozed out of the electrode body.

EXAMPLE 5

Lithium ion secondary batteries were produced in the same manner as in Examples 1 and 2, except for replacing the MDI/PEGPG mixture with a liquid mixture of 8 parts of MDI, 32 parts of PEGPG, and 60 parts of diethyl carbonate and heating the packaged battery body at 60° C. for 30 minutes to gel the mixture.

As a result of measurement of discharge characteristics, each of the batteries was equal in battery performance to the conventional battery whether the resin film was provided all over the exterior surface of the electrode roll or on only the edges of the electrode roll. When the batteries having the resin film all over the electrode body were stored at 85° C. for 10 hours, the increase in volume was considerably reduced as compared with that observed with the conventional battery as shown in Table 4 below. The increase in volume of the batteries having the resin film only on the edges of the electrode body was similarly reduced as compared with the conventional battery. Further, all the batteries of Example 5 suffered from no leak of the electrolytic solution. When the bag was opened, it was found that the electrode body and the bag were adhering to each other via the resin film, the resin film had been gelled, and the electrolytic solution had not at all oozed out of the electrode body.

TABLE 4

| | Increase in Volume |
|---|---|
| Conventional Battery | 1 |
| Battery of Example 5 | 0.15 |

The preferred embodiments of the present invention and their effects are summarized below.

1) A lithium ion secondary battery having an electrode body comprising a positive electrode (preferably made of a positive electrode active material layer joined to a current collector), a negative electrode (preferably made of a negative electrode active material layer joined to a current collector), a separator which is disposed between the positive electrode and the negative electrode and retains an electrolytic solution containing lithium ions, and a porous adhesive resin layer which retains the electrolytic solution and joins the separator to the positive electrode (preferably the positive electrode active material layer) and to the negative electrode (preferably the negative electrode active material layer), the electrode body being sealed into a packaging bag, wherein a resin film is provided between the electrode body and the packaging bag in intimate contact with the electrode body.

1) Implementation (1) provides a lithium ion secondary battery which is thin and light and yet the packaging bag of which is suppressed from expansive deformation due to gas generated in case of a battery temperature rise during storage or in use.

2) The battery according to implementation (1), wherein the resin film is provided all over the exterior surface of the electrode body.

According to implementation (2), expansive deformation of the packaging bag can be prevented more certainly. The resin film of this structure can easily be prepared by dipping the whole electrode body in a liquid resin material.

3) The battery according to implementation (1), wherein the resin film is provided on the sides of the electrode body perpendicular to the electrode plane.

According to implementation (3), expansive deformation of the packaging bag can be prevented while saving the resin material and minimizing the increase in battery volume due to the resin film.

4) The battery according to implementation (1), wherein the electrode body and the packaging bag are adhered to each other with the resin film.

According to implementation (4), there is no space between the electrode body and the packaging bag so that expansion of the packaging bag can be prevented more effectively.

5) The battery according to implementation (1), wherein the resin film is capable of absorbing the electrolytic solution.

According to implementation (5), an excess of the electrolytic solution is absorbed by the resin film to prevent leakage of the electrolytic solution more effectively.

6) The battery according to implementation (1), wherein the resin film is made of a material capable of gelling.

According to implementation (6), the resin film has sufficient softness to keep close contact with the electrode body even if the electrode body is deformed. Further, the packaging bag or the electrode body can be protected from breakage due to an external shock, etc.

The battery according to implementation (1), wherein the resin film is prefereably made of a gel film.

According to the above implementation, since the resin film is completely gelled, the resin has sufficient softness to keep close contact with the electrode body even if the electrode body is deformed. Further, the packaging bag or the electrode body can be protected from breakage due to an external shock, etc.

7) The battery according to implementation (1), wherein the starting material of the resin film is liquid at room temperature.

8) The battery according to implementation (6), wherein the resin film is capable of gelling in the presence of the electrolytic solution.

9) The battery according to implementation (6), wherein the resin film is capable of gelling in the presence of a liquid component constituting the electrolytic solution.

10) The battery according to implementation (6), wherein the resin film is capable of gelling in the presence of a nonaqueous solvent.

11) The battery according to implementation (10), wherein the nonaqueous solvent comprises at least one of ester solvents and ether solvents.

12) The battery according to implementation (11), wherein the nonaqueous solvent comprises diethyl carbonate.

13) The battery according to implementation (11), wherein the nonaqueous solvent comprises ethylene carbonate.

14) The battery according to implementation (4), wherein the resin film is one prepared from a starting compound containing an isocyanate group.

According to implementation (14), the resin film exhibits adhesiveness, capability of absorbing an electrolytic solution, and capability of gelling upon absorbing a liquid to exert the above-described effects. Further, many of the compound containing an isocyanate group are liquid at room temperature. Such liquid compounds are easy to apply to the electrode body.

15) The battery according to implementation (4), wherein the resin film is one prepared from a starting compound containing an acrylate group or a methacrylate group.

According to implementation (15), the resin film exhibits adhesiveness, capability of absorbing an electrolytic solution, and capability of gelling upon absorbing a liquid to exert the above-described effects. Further, many of the compound containing an acrylate group or a methacrylate group are liquid at room temperature. Such liquid compounds are easy to apply to the electrode body.

16) The battery according to implementation (14), wherein the resin film is a polyurethane resin film obtained by polyaddition of a diisocyanate and a diol having a hydroxyl group at both terminals thereof.

17) The battery according to implementation (14), wherein the resin film is a polyurea resin film obtained by polyaddition of a diisocyanate and an amine.

18) The battery according to implementation (15), wherein the resin film is one prepared from an oligo(alkylene glycol) acrylate.

19) The battery according to implementation (15), wherein the resin film is one prepared from an oligo(alkylene glycol) methacrylate.

20) The battery according to implementation (1), wherein the resin film is one prepared by dipping the electrode body in a liquid starting material of a resin, vacuum sealing the electrode body in a packaging bag, and heating the packaged electrode body to gel the resin.

What is claimed is:

1. A lithium ion secondary battery having an electrode body comprising a positive electrode, a negative electrode, a separator which is disposed between said positive electrode and said negative electrode and retains an electrolytic solution containing lithium ions, and a porous adhesive resin layer which retains the electrolytic solution and joins said separator to at least one of said positive electrode and said negative electrode, said electrode body being sealed into a packaging bag, wherein a resin film is provided between said electrode body and said packaging bag in intimate contact with said electrode body, said resin film having adhesiveness and adhering the electrode body to the packaging bag.

2. The lithium ion secondary battery according to claim 1, wherein said resin film is provided all over the exterior surface of said electrode body.

3. The lithium ion secondary battery according to claim 1, wherein said resin film is provided on the sides of said electrode body perpendicular to an electrode plane.

4. The lithium ion secondary battery according to claim 1, wherein said resin film is capable of absorbing said electrolytic solution.

5. The lithium ion secondary battery according to claim 1, wherein said resin film is made of a material capable of gelling.

6. The lithium ion secondary battery according to claim 1, wherein the starting material of said resin film is liquid at room temperature.

7. The lithium ion secondary battery according to claim 5, wherein said resin film is capable of gelling in the presence of said electrolytic solution.

8. The lithium ion secondary battery according to claim 5, wherein said resin film is capable of gelling in the presence of a liquid component constituting said electrolytic solution.

9. The lithium ion secondary battery according to claim 5, wherein said resin film is capable of gelling in the presence of a nonaqueous solvent.

10. The lithium ion secondary battery according to claim 9, wherein said nonaqueous solvent comprises at least one of ester solvents and ether solvents.

11. The lithium ion secondary battery according to claim 10, wherein said nonaqueous solvent comprises diethyl carbonate.

12. The lithium ion secondary battery according to claim 10, wherein said nonaqueous solvent comprises ethylene carbonate.

13. The lithium ion secondary battery according to claim 1, wherein said resin film is a resin film prepared from a compound containing an isocyanate group.

14. The lithium ion secondary battery according to claim 1, wherein said resin film is a resin film prepared from a compound containing an acrylate group or a methacrylate group.

15. The lithium ion secondary battery according to claim 13, wherein said resin film is a polyurethane resin film obtained by polyaddition of a diisocyanate and a diol having a hydroxyl group at both terminals thereof.

16. The lithium ion secondary battery according to claim 14, wherein said resin film is a polyurea resin film obtained by polyaddition of a diisocyanate and an amine.

17. The lithium ion secondary battery according to claim 15, wherein said resin film is a resin film prepared from an oligo(alkylene glycol) acrylate.

18. The lithium ion secondary battery according to claim 15, wherein said resin film is a resin film prepared from an oligo(alkylene glycol) methacrylate.

19. The lithium ion secondary battery according to claim 1, wherein said resin film is a resin film prepared by dipping the electrode body in a liquid starting material of a resin, vacuum sealing the electrode body in a packaging bag, and heating the packaged electrode body to gel the resin.

* * * * *